United States Patent
Lunter et al.

(10) Patent No.: US 8,306,543 B2
(45) Date of Patent: Nov. 6, 2012

(54) METHOD FOR PROVIDING RANDOM ACCESS TO COMMUNICATION SYSTEM

(75) Inventors: Pavol Lunter, Bratislava (SK); Richard Waldhauser, München (DE); Martin Wolf, Liptovsky Hradok (SK)

(73) Assignee: Nokia Siemens Network Oy, Espoo (FI)

( * ) Notice: Subject to any disclaimer, the term of this patent is extended or adjusted under 35 U.S.C. 154(b) by 187 days.

(21) Appl. No.: 12/449,352

(22) PCT Filed: Feb. 5, 2008

(86) PCT No.: PCT/EP2008/051424
§ 371 (c)(1),
(2), (4) Date: Jan. 4, 2010

(87) PCT Pub. No.: WO2008/095941
PCT Pub. Date: Aug. 14, 2008

(65) Prior Publication Data
US 2010/0113044 A1    May 6, 2010

(30) Foreign Application Priority Data

Feb. 5, 2007 (EP) .................................. 07002424
Jun. 19, 2007 (EP) .................................. 07012013

(51) Int. Cl.
*H04W 72/00* (2009.01)
(52) U.S. Cl. .............. 455/450; 455/434; 455/435.1; 455/452.1; 455/452.2
(58) Field of Classification Search ............ 455/434, 455/435.1, 435.2, 450, 451, 452.1, 452.2
See application file for complete search history.

(56) References Cited

U.S. PATENT DOCUMENTS

| | | | |
|---|---|---|---|
| 5,729,542 A * | 3/1998 | Dupont .................. | 370/346 |
| 6,452,915 B1 | 9/2002 | Jorgensen | |
| 6,640,248 B1 * | 10/2003 | Jorgensen .................. | 709/226 |
| 2002/0041578 A1 | 4/2002 | Kim et al. | |
| 2003/0054829 A1 | 3/2003 | Moisio | |
| 2004/0032877 A1 | 2/2004 | Chuah et al. | |
| 2006/0018289 A1 | 1/2006 | Schulist et al. | |
| 2006/0018336 A1 | 1/2006 | Sutivong et al. | |

FOREIGN PATENT DOCUMENTS

| | | |
|---|---|---|
| EP | 1 098 542 A2 | 5/2001 |
| WO | 00/32000 | 6/2000 |

OTHER PUBLICATIONS

International Search Report for Application No. PCT/EP2008/051424; mailed Jun. 2, 2008.
3rd Generation Partnership Project; Technical Specification Group Radio Access Network; Medium Access Control (MAC) protocol specification (Release 7); 3GPP TS 25.321 v7.3.0, Dec. 2006, pp. 66-72.
J. Niththiyanathan; "Performance Analysis of the Random Access Procedure in WCDMA"; Nov. 2002; pp. 1-15.
3rd Generation Partnership Project; Technical Specification Group Radio Access Network; Physical layer aspect for evolved Universal Terrestrial Radio Access (UTRA); 3GPP TR 25.814 V7.1.0; Sep. 2006; pp. 1-132.

* cited by examiner

*Primary Examiner* — Temica M Beamer
(74) *Attorney, Agent, or Firm* — Staas & Halsey LLP (57) ABSTRACT

In a communication system providing services with different quality of service requirements to a plurality of user equipment sharing resources of the communication system, resources of the communication system are allocated for service requests. The allocating of resources includes dividing the resources into at least two groups of resources, the different groups of resources being dedicated to different types of service.

13 Claims, 5 Drawing Sheets

TDM/FDM option example using 1 sub-frame and preamble-only transmission in the random access burst

An example traffic model that the non-synchronised RACHs are transmitted in busy hour

| Transmission cause | | Number of attempts |
|---|---|---|
| Initial access | Tracking area update | 6 times / hour |
| | Number of realtime service calls | 1 call / hour |
| | Number of non-realtime service calls | 2 calls / hour |
| Handover complete<br><br>Cell change interval is assumed to be 20 s. | Realtime service<br><br>The holding time is assumed to be 90 s. | 4.5 times / call<br><br>(= 90 / 20) |
| | Non-realtime service<br><br>The sojourn time is assumed to be 300 s. | 15 times / call<br><br>(= 300 / 20) |
| UL scheduling requests | Realtime service<br><br>Persistent resource allocation is assumed, hence causing no UL scheduling request | 0 time / call |
| | Non-realtime service<br><br>One UL scheduling request is assumed to be sent per packet call in the ETSI Web Browsing model | 4 times / call |

METHOD FOR PROVIDING RANDOM ACCESS TO COMMUNICATION SYSTEM

CROSS REFERENCE TO RELATED APPLICATIONS

This application is a U.S. national stage of International Application No. PCT/EP2008/051424, filed Feb. 5, 2008 and claims the benefit thereof. The International Application claims the benefits of European Application No. 07002424 filed on Feb. 5, 2007 and European Application No. 07012013 filed on Jun. 19, 2007, all applications are incorporated by reference herein in their entirety.

BACKGROUND

Described below is a method for providing random access to a communication system, the communication system providing services with different quality of service requirements to a plurality of user equipment.

SUMMARY

In radio communications systems such as 3G (Third Generation Wireless Mobile Communication Technology), 3G Long Term Evolution (LTE) or 4G (Fourth Generation Wireless Mobile Communication Technology), plural user equipment (UEs) execute a random access procedure in order to access the radio communications network at arbitrary times. For this purpose time/frequency/code resources are allocated to the UEs and are usually shared among all UEs present. Collisions may occur during random access attempt of more UEs. This occurs for example when two or more UEs attempt to access the RACH (Random Access Channel) e.g. in order to execute the random access procedure at the same time.

This results in the UEs stopping the access procedure for a random amount of time, termed the backoff period, before starting again. However, this delay results in a UE not being in communication with an AP (Access Point) and thus not accessing the radio communications system. For services having real-time requirements that a UE wishes to use such as streaming data, internet services, gaming services or simply voice communications, such delays reduce the efficiency of the services and the overall efficiency of the radio communications system. However, other types of services may run in the background such that delays may not be very disturbing.

In view of the above, a need exists for a technique that reduces the amount of collisions that occur within a radio communications system between user equipment for services with high quality of service requirements as well as for improving the efficiency of the radio communications system and of the services that are being provided.

The method described below seeks to overcome the problems of the related art as described above.

In a method for providing random access to a communication system, the communication system providing services with different quality of service requirements to a plurality of user equipment sharing resources of the communication system, the method includes at least one step of allocating resources of the communication system for service requests.

According to one aspect, the step of allocating resources includes dividing the resources into at least two groups of resources, the different groups of resources being dedicated to different types of service. The method may help to reduce collisions between a plurality of user equipment in a radio communications system during an access procedure, in particular in cases where collisions are extraordinary disturbing.

Moreover, it is proposed that the different groups are dedicated to services with different quality of service. The group size can be determined depending on the quality of service required for a specific type of service. In particular, the group size may be determined in a way that assures that an acceptable collision probability for the type of service under consideration. Real-time services may be provided with a larger amount of resources per candidate, whereas background services, where collisions are less distracting, may be grouped in a group with a smaller amount of resources per candidate.

In alternative approaches, other criteria than the quality of service might be used. E.g. in the field of UMTS there exist the concepts of Access Class (AC) and Access Service Classes (ASC). Such concepts have been very recently proposed also for LTE. Therefore, the method includes dividing the resources into groups dedicated to particular Access Class and/or Access Service Classes. In other words, it is proposed to split the RACH resources according to the required QoS, Access class or Access Service Class or any combination thereof. Possible access classes include a class of normal user equipment, a class for emergency calls, a class for Public Land and Mobile Network (PLMN) use, a class for security services, a class for public utilities, a class for emergency services and a class for PLMN staff.

The merits of the method are particularly apparent if the communication system is a radio communication system, since in this case the resources are limited due to the fact that air is a medium shared between a large number of applications. However, the method may be applied to other communication systems with limited resources either, e.g. powerline communication systems or wired communication systems.

The signaling load may be kept small if the allocation of groups of resources for the user equipment is executed by at least one access point of a plurality of access points of the communication system.

A transparent while dynamically adaptable grouping of resources may be achieved if the method includes transmitting the group allocation by the at least one access point over a first, predetermined channel to the plurality of user equipment. Upon receiving the message containing parameters relating to the allocation of groups of resources, the user equipment may select an appropriate resource from at least one group of the groups, the selection depending on the quality of service requirement of a service requested by the user equipment.

An advantageous possibility for differentiation between different quality of service requirements may include selecting a length of access time required for the access procedure as the least one quality of service requirement decisive for the grouping of resources.

The access procedure can be flexibly adapted to the specific needs of a given service type if the resources to be grouped are access resources used by the user equipment during the access procedure. The access resources may for example be at least one of the following: a frequency resource, a time resource, a code.

In particular, the method may include allocating by at least one access point of a plurality of access points, groups of resources for user equipment, the allocation depending on at least one quality of service requirement; transmitting the allocation by the at least one access point over a first channel to the plurality of user equipment, and upon receiving the allocation a user equipment of the plurality selecting an appropriate resource from at least one group of the groups, the selection depending on a service requirement of the user equipment.

According to a further aspect, an access point having means arranged to execute the method is described.

Moreover, user equipment having means arranged to execute the method is described.

Finally, a radio communication system having at least one access point and at least one user equipment in the above sense is described.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
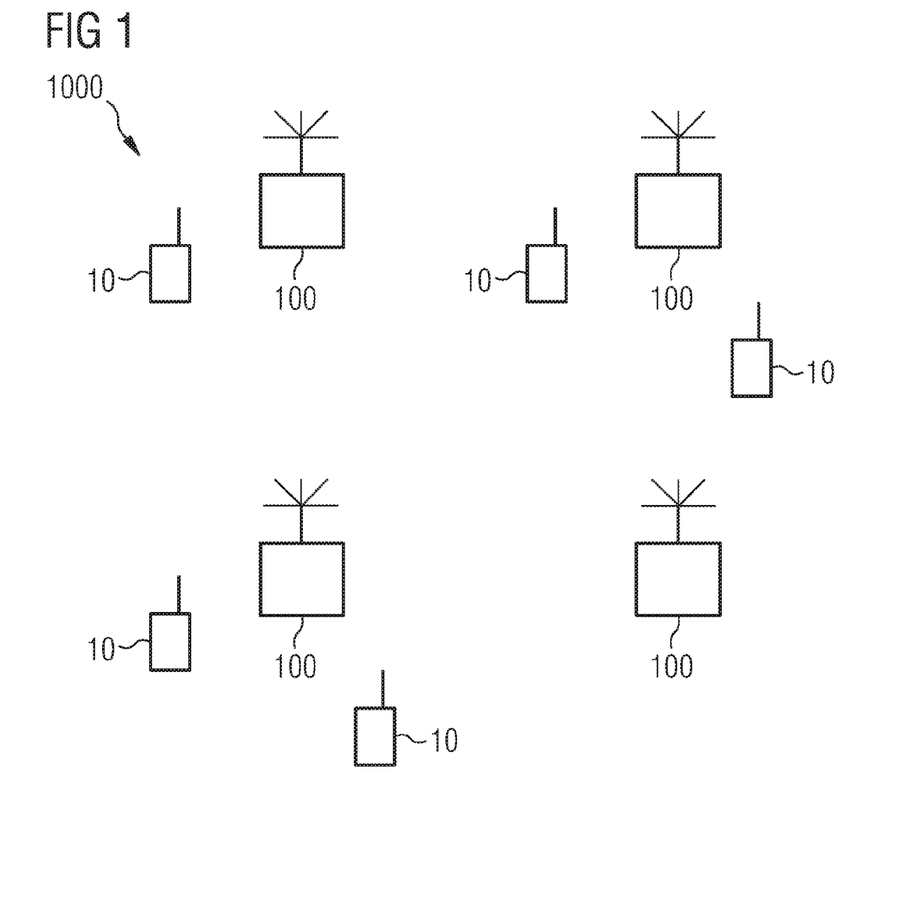
FIG. 1 is a block diagram of a radio communications system wherein the technique described herein is implemented.

FIG. 1 depicts a radio communications system 1000 wherein the method is implemented. The radio communication system 1000 includes a plurality of user equipment (UE) 10 and a plurality of access points (AP) 100 that allow the UEs 10 to access the radio communications system 1000 and via the radio communications system 1000 to connect to the Internet and/or the PSTN (Public Switched Telephone Network).

The radio communication system 1000 can provide at least one of the following services to UEs 10: internet services, voice services, gaming services, streaming services etc. A UE 10 can be at least one of the following: a mobile/cellular phone, a personal computer or any other device enabled to connect to radio communications system 1000. An AP 100 can be at least one of the following: a BS (base station), a nodeB, an enodeB, a RNC (radio network controller), a BSC (base station controller). Both UEs 10 and APs 100 implement the technique described herein using means may include at least one of a microcomputer, an integrated circuit, and a chip.

Figure 2:
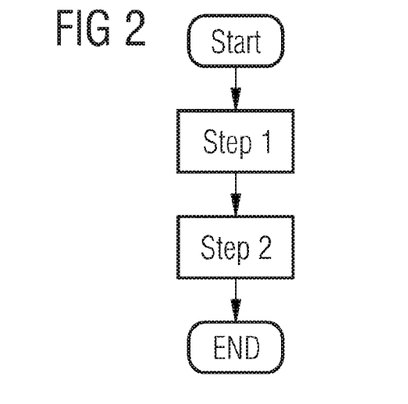
FIG. 2 is a flow diagram indicating the technique described herein.

FIG. 2 depicts a flow diagram indicating the technique described herein.

At 1 an AP 100 allocates groups of resources for UEs 10. The allocation depends on at least one quality of service requirement. In a further refinement of the technique, the at least one quality of service requirement (QoS) is a length of access time required for the access procedure that a UE 10 requires. The resources that are allocated are, in a refinement of the technique, access resources used by the UEs 10 during an access procedure. These access resources can be at least one of the following: a frequency resource, a time resource, a code to be used during the access procedure.

To avoid collisions, a relatively large amount of resources are allocated to groups having an increased QoS requirement i.e. such groups requiring a short access time. Less resources are allocated to groups of a second kind, wherein the latter groups of resources are dedicated to serve user equipment requests with less demanding QoS requirements. The allocation of the amount of resources into groups according to QoS requirements can be predefined by a network operator or can be modified in real-time for example according to the number of UEs 10 present in the radio communications system 1000 or within a cell being controlled by an AP 100, or by taking statistical information about the number and type of services being requested or the number of collisions having occurred.

The groups may be dynamically changing depending e.g. on the amount and/or the fraction of user equipment (UE) 10 of a specific type being camped on the access point 100. In a further embodiment with a particularly low signaling load, the groups may be fixed, such that the group allocation step has to be executed only once.

In step 2, the AP 100 transmits the allocation over a first channel, for example over a downlink shared channel, to the UEs 10. Following the reception of the message containing the allocation data, the UE 10 selects an appropriate resource from at least one group. The choice of the group depends on a service requirement of the UE 10, for example, for a service involving streaming data a very short access time is required, therefore the UE 10 will select resources that are grouped within a group allocated to high QoS requirements.

If there is a number of different groups having resources allocated corresponding to different QoS requirements, the UE 10 can select one according to a previously effected selection, or e.g. according to the amount of data that has to be transmitted.

The illustration in FIG. 1 relates to a radio communications system 1000 being realized as a 3G LTE communication system. However, the same technique can be applied in other radio communications system as well. In particular, the scope of the method covers systems with a similar access procedure such as WIMAX, WINNER etc.

According to TS (Technical Standard) 25.814 "Physical layer aspect for evolved Universal Terrestrial Radio Access (UTRA)" in LTE two types of RACH (Random Access Channel) may be classified, namely synchronized and non-synchronized.

The non-synchronized access is used when the UE uplink has not been time synchronized or when the UE uplink has lost synchronization. The non-synchronized access allows the eNodeB to estimate, and, if needed, adjust the UE transmission timing to within a fraction of the cyclic prefix.

The synchronized random access may be used when the UE uplink is time synchronized by the NodeB. The purpose is for the UE to request resources for uplink data transmission.

The random access procedure according to the method may be generally performed in contention free or contention based manner. "Contention based" means there are less orthogonal resources than possible UEs 10 or one orthogonal resource is not exclusively allocated to one UE 10.

Figure 3:
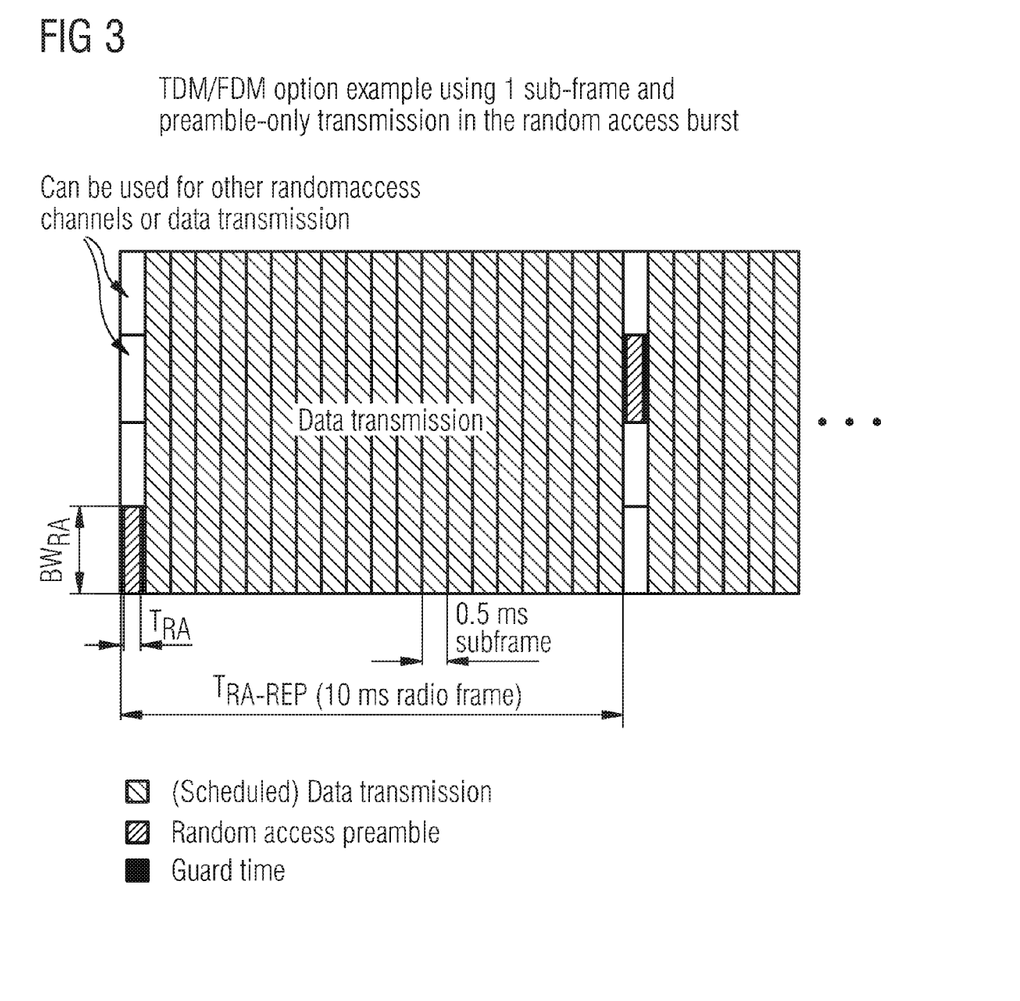
FIG. 3 is a schematic representation of a random access burst signal including a random access preamble.

The random-access procedure in the embodiment is based on the transmission of a random-access burst (preamble). Time frequency resources for the random-access attempts are controlled by the RRM (Radio Resource Management) configuration. This is illustrated in FIG. 3, where random-access transmissions are restricted to certain time or frequency resources, for example FDM (Frequency Division Multiplexing) or TDM (Time Division Multiplexing).

According to alternative embodiments, random access transmissions are not restricted to a particular time or frequency resource, like for example in CDM (Code Division Multiplexing).

The random access burst transmitted by the UE 10 contains a signature which identifies the UE 10 executing the random access procedure. For example, LTE Zadoff-Chu sequences can be used for this purpose. From the whole set, sequences with acceptable cross-correlation and autocorrelation properties can be chosen.

The RACH procedure may be performed in particular as follows. The UE 10 randomly chooses a signature from the code set and creates a preamble. The preamble is transmitted on certain well known time/frequency/code resources. If there are plural frequency regions at the same time allocated for random access, the UE 10 may choose randomly one of them. The eNodeB 100 correlates received random access bursts with all signatures and waits for the peak on the output of autocorrelation function. Collision occurs if two or more UEs 10 choose identical preamble signatures and transmit on the same random access frequency block in the same time.

The total number of RACH opportunities corresponding to the number of available access resources is given by $N_{RACH}=N_T*N_F*N_{sign}$, where $N_T$ is number of time slots per second, $N_F$ is number of frequency blocks per time slot and $N_{sign}$ is number of preamble sequences. The above number $N_{RACH}$ corresponds to the number of resources of the communication system 1000.

If the number of RACH opportunities grows, probability of collision decreases and vice versa. According to one aspect, it is proposed to allocate a larger amount of random access resources forming a first group of resources to those UEs 10 which demand short access times (also defined as golden or first class users/services) and less resources to a group or resources dedicated to serve UEs with lower demands (silver, bronze etc. or low class). In other words, the access time is chosen as the quality of service requirement determining the allocation of groups of resources of the communication system 1000.

In a practical example, 20 signatures from the total set of signatures/resources (let assume 256 of them) are allocated for 40 "golden" UEs with particularly high quality of service requirements, another 20 signatures are allocated for 200 silver UEs with intermediate quality of service requirements and the rest of 216 signatures is allocated for 3000 remaining camped UE 10 in the cell covered by the access point 100.

A similar approach as described above with respect to the signature resources may be applied to the time and frequency resources of a communication system 1000. The number of groups or the way of division is not limited and should be chosen in order to optimally meet QoS (Quality of Service) requirements in particular network (cell).

For a better illustration, calculations for non-synchronized RACH with the following assumptions are given below. There are 4000 UEs 10 camped (located) in the cell and may use services with three QoS classes. A signature from the defined group which is most appropriate to the class of the service a UE wants (or is permitted to use) is chosen. In the first group 16 signatures are assumed for 32 UEs 10, on average 2 UEs 10 for 1 signature. In the second group 32 signatures are allocated for 256 UEs 10 what leads to 8 UEs 10 per signature in average. Remaining signatures (208) are used by remaining 3712 UEs 10. For simplicity, it is assumed that the random access slot occurs each 10 ms (FIG. 3) and there is one frequency block per slot. Alternative embodiments as shown in FIG. 3 may contain more than one, e.g. 4 frequency blocks per time slot.

The collision probability per one signature is given by following formula:

$$P_{collision\_sign} = 1 - e^{-\frac{\gamma}{N_T N_F N_{sign}}}\left(1 + \frac{\gamma}{N_T N_F N_{sign}}\right),$$

where $\gamma$ is the average number of non-synchronized RACH attempts per second and NT is number of time slots per second, NF is number of frequency blocks per time slot and $N_{sign}$ is number of preamble sequences as has already been indicated above. Furthermore, the probability for at least one collision within a time slot, $P_{collision\_slot}$, may be represented as $$P_{collision\_slot}=1-(1-P_{collision\_sign})^{N_F N_{sig}},$$

Figure 4:
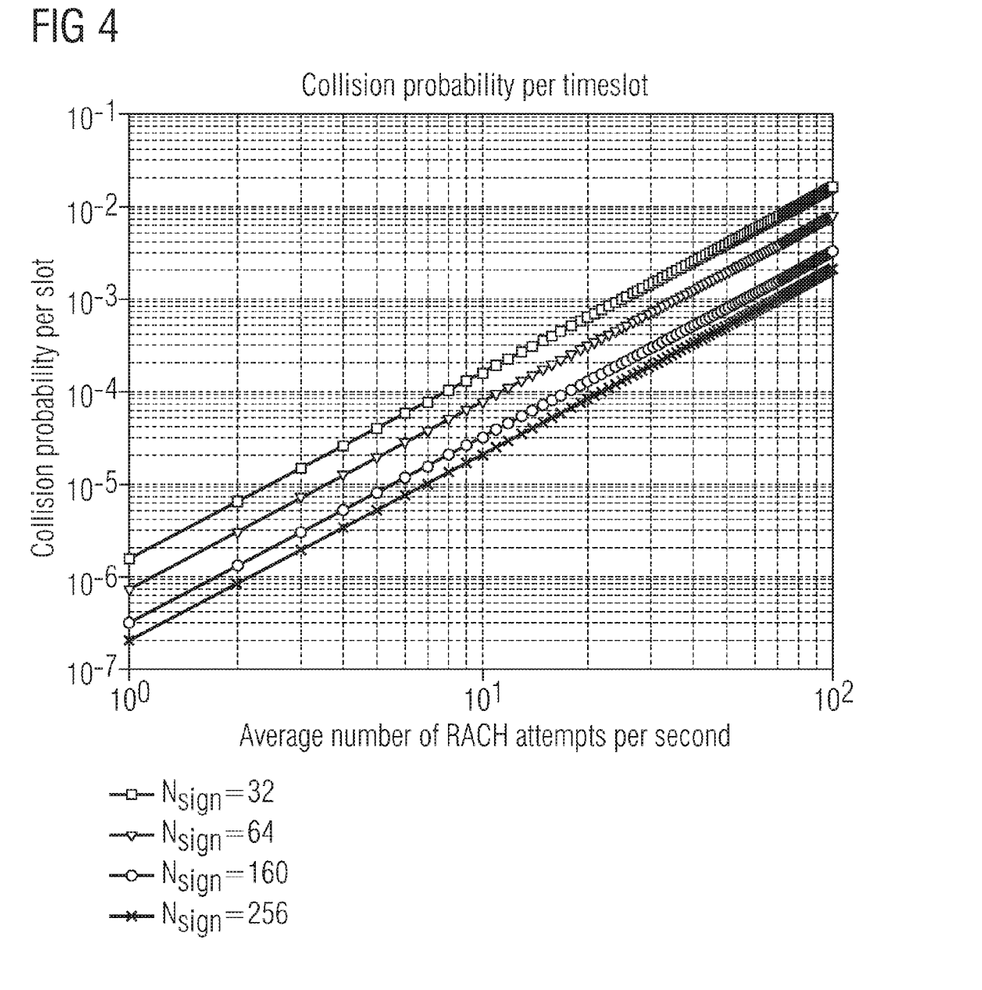
FIG. 4 is a log-log graph of a collision probability per timeslot depending on an average number of RACH attempts per second.

FIG. 4 shows the collision probability per time slot, $P_{collision\_slot}$, as a function of $\gamma$ in a log-log plot.

Figure 5:
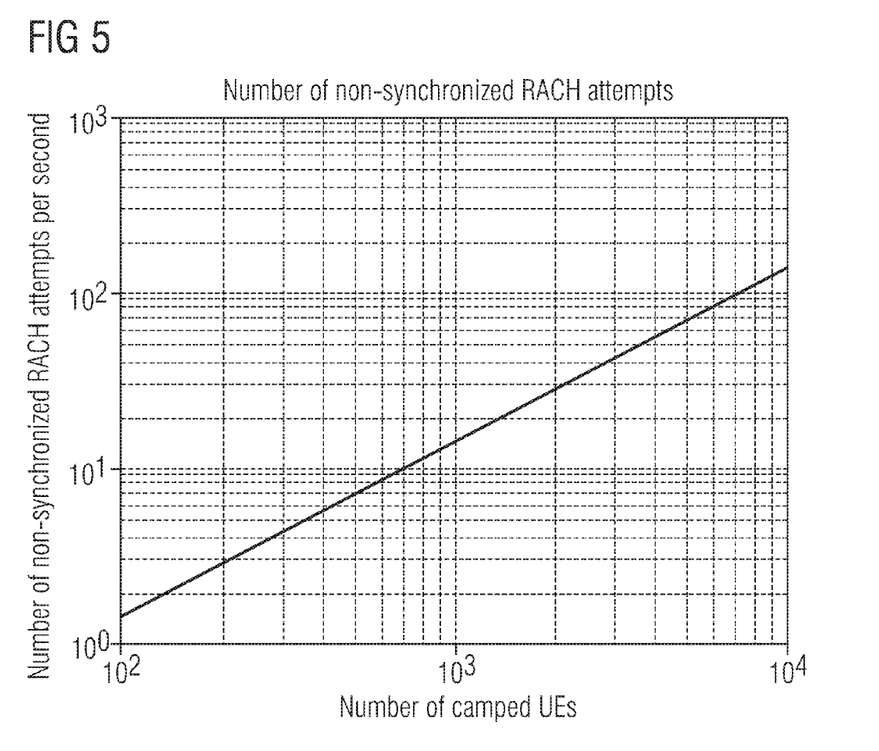
FIG. 5 is a log-log graph illustrating a number of unsynchronized RACH attempts per second depending on a number of camped user equipment according to a traffic model.
Figure 6:
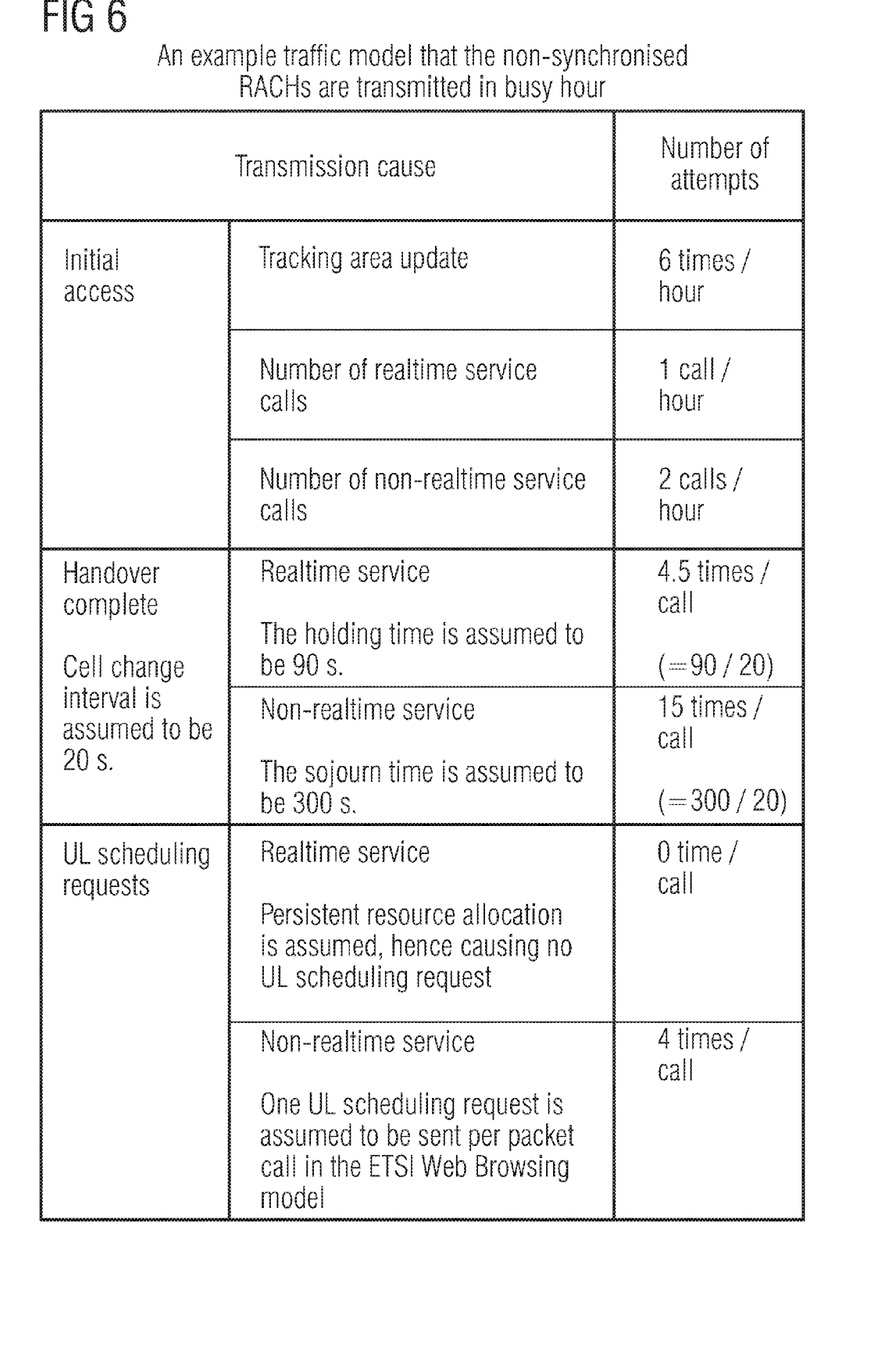
FIG. 6 is a table describing the parameters of a traffic model used for calculating the number of unsynchronized RACH attempts according to FIG. 5 and for calculating the collision probability.

Assuming the traffic model as described in the table of FIG. 6, the number of non-synchronized RACH attempts is derived illustrated in FIG. 5. The horizontal axis represents the number of camped UEs 10 in a cell, and the vertical axis is the number of non-synchronised RACH attempts per second per cell. The line shows the number of non-synchronised RACH attempts corresponding to the traffic model.

According to the proposed traffic model, the average number of RACH attempts for 100 UEs 10 is less than 2 per second (exactly 1.3472). For this number of attempts, the probability of collision is 2.8351e−6. For the second group (500 UEs, 64 signatures) probability of collision is 3.5424e−5 and for the remaining UEs 10 (2600 UEs, 160 signatures), the collision probability is 3.8279e−004. If there was not any split according to QoS (Quality of Service), the collision probability with the same model for all 3000 UEs 10 in the cell and 256 available signatures would be 3.1866e−4. From these calculations it may be seen that low QoS UEs 10 suffer from less access opportunities and a slightly higher collision rate, but the performance of the whole radio communications system meets the individual traffic requirements in an overall satisfactory way.

The UE 10 could obtain signatures (information how sequences are generated) from a received transmission over a downlink shared channel from eNodeB 100 once it enters the cell. The same applies for the QoS extension, whereby information concerning which groups are available for different QoS requirements and what are the parameters for each group is also obtained from downlink transmissions. The UE 10 would than decide alone what kind of QoS is required and would chose a signature from the appropriate group of signatures.

Furthermore, in order to decrease amount of necessary control information in the downlink, some well known groups matched to certain QoS may be standardised and eNodeB 100 would signal only labels of available groups in the cell. The UE 10 would have a lookup table where parameters could be found.

According to a further aspect, the collision probability may be further significantly reduced. As described above, it has been found that it is more efficient to split candidates for random access into smaller groups and to exclusively allocate a corresponding amount of the resources for this group, than to use only one big group and to randomly access all resources.

The collision probability at least for the UEs with high QoS requirements may be further reduced if following conditions are fulfilled. The size of the group should be calculated as $N_{group}=\text{ceil}(N_{candidates}/N_{resources})$, where $N_{group}$ is size of the group, $N_{candidates}$ is number of all random access candidates and $N_{resources}$ is number of available resources. The result of division is rounded up to the closest integer using the "ceil" function.

The above calculation will be illustrated by an example. If we have 256 signatures and 3072 UEs 10, the collision probability would be 3.3413e−004 (same calculation as in the previous example). If 3072 UEs 10 are split into 256 groups of 32 UEs 10 and one signature from 256 is assigned to each group, than collision probability in each group is only 9.2662e−006 and we are still able to serve same number of UEs 10, i.e. 3072.

A further aspect is finding a way to allocate the groups and to signal the allocations to the UEs, while keeping signalling required for the group allocation in the communication system at a reasonable level. The brute force approach would be to transmit separately to each UE 10 which group it belongs to. However, sometimes the eNodeB 100 does not even know what UEs are camped in its cell.

Frequent handovers between neighbouring access points 100 may cause further problems. According to a further aspect, the following solution is proposed. The focus is put only on the relatively small group of UEs 10 running a session. The UE 10 could transmit request to be assigned to the certain group once special session is started (e.g. game of VoIP call) and the code (or the equivalent resource) would remain allocated over duration of the session. This would require increased processing in eNodeB 100 (code and assignment to the UE 10 needs to be kept) and also interaction with higher layers (for example Layer-3). The advantage is that the method allows for similar collision probabilities using fewer resources, or for a significant decrease in the collision probability for the services susceptible for collisions.

Although the above embodiment uses signatures (codes) as resources, the skilled person can easily generalize the method as described above to split resources in time domain or in frequency domain.

Major advantages of the proposed technique are:
1. It may be applied to any kind of random access (synchronous, asynchronous or combined) and has a low signalling overhead.
2. It may be applied in a variety of radio communications system which use random access procedure, for example WIMAX, WINNER.
3. Random access with defined collision parameters for a given QoS can be used.

The method described herein allows the random access performance to be set freely according to required collision probability by increasing or decreasing the size of the group of resources dedicated to the quality of service under consideration. In practice, of course, the freedom of setting the random access performance is limited due to the limited resources available and/or by the price of the available resources.

The access time for some preferred services may be set to a shorter value, which may help to fulfill required QoS. The method allows for a resources allocation where background non-time critical services do not take resources which can be used for demanding applications. Services where collisions are less distracting may be grouped together in a group with a lower number of resources per candidate, whereas services where the collision probability should be as low as possible can be assigned to a group of resources where the number of resources per candidate is high.

The method allows for a better resource utilization, which can be achieved by a suitable grouping of resources. The grouping may be determined by a network operator and/or by a network operating system (OMC) according to expected traffic in the cell.

According to further embodiments, the technique is implemented in LTE where resources are allocated for scheduling transmissions for services that consume a lot of resources, like for example gaming, where short reaction time is required in order to fulfill users' expectations. This consumes a lot of resources which are dedicated and most of the time not used. Asynchronous random access can be much more suitable for this kind of asynchronous traffic, if short access time is guaranteed. According to one aspect, small groups of resources are created and a corresponding amount of random access opportunities are dedicated to the demanding application under consideration. This can be achieved with a reasonable amount of signaling.

Although the method has been described in terms of embodiments and refinements thereof, those skilled in the art will appreciate other embodiments and modifications which can be made without departing from the scope of the teachings herein.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method to provide random access to a communication system, the communication system providing services with different quality of service requirements to a plurality of user equipment sharing resources of the communication system, the method comprising:
   allocating resources of the communication system for service requests, by at least dividing the resources into at least two groups of resources, the at least two groups of resources being dedicated to different types of service;
   modifying a size of a group of resources dedicated to a quality of service based on a required collision probability, and
   wherein at least one of the quality of service requirements is a length of access time required for an access procedure.

2. A method according to claim 1, wherein the at least two groups of resources are access resources used by the user equipment during the access procedure.

3. A method according to claim 2, wherein the access resources are at least one of a frequency resource, a time resource and a code.

4. A method according to claim 1, wherein the at least two groups are dedicated to services with different quality of service requirements.

5. A method according to claim 1, wherein the at least two groups are dedicated to services with different access classes.

6. A method according to claim 1, wherein the at least two groups are dedicated to services with different access service classes.

7. A method according to claim 6, wherein the communication system is a radio communications system.

8. A method according to claim 7, wherein said allocating of the at least two groups of resources for the user equipment is executed by at least one access point of a plurality of access points of the communication system.

9. A method according to claim 8, further comprising transmitting results of said allocating by the at least one access point over a first, predetermined channel to the plurality of user equipment.

10. A method according to claim 9, further comprising, upon receiving the results of said allocating, selecting, by an item of the user equipment, an appropriate resource from at least one of the at least two groups of resources, depending on a quality of service requirement of a service requested by the item of the user equipment.

11. An access point in a communication system, comprising:

at least one processor programmed to allocate resources of the communication system for service requests, by at least dividing the resources into at least two groups of resources, the at least two groups of resources being dedicated to different types of service, wherein a quality of service requirement is a length of access time required for an access procedure, and wherein, a size of a group of resources dedicated to a quality of service is modified according to a required collision probability.

12. User equipment in a communication system, comprising:

at least one processor programmed to allocate resources of the communication system for service requests, by at least dividing the resources into at least two groups of resources, the at least two groups of resources being dedicated to different types of service, wherein a quality of service requirement is a length of access time required for an access procedure, and wherein, a size of a group of resources dedicated to a quality of service is modified according to a required collision probability.

13. A radio communications system, comprising:

at least one access point providing at least two groups of access resources during an access procedure; and at least one item of user equipment having at least one processor programmed to allocate the access resources of the communication system for service requests, by at least dividing the access resources into at least two groups of the access resources dedicated to different types of service, wherein a quality of service requirement is a length of access time required for an access procedure, and wherein, a size of a group of resources dedicated to a quality of service is modified according to a required collision probability.

* * * * *